United States Patent [19]

Heinrich

[11] 4,098,475

[45] Jul. 4, 1978

[54] PARACHUTE WITH SELECTIVELY ADJUSTABLE BRAKE FLAPS FOR CONTROLLING ANGLE OF DESCENT

[75] Inventor: Helmut G. Heinrich, Minneapolis, Minn.

[73] Assignee: Bruggemann & Brand KG, Fed. Rep. of Germany

[21] Appl. No.: 715,513

[22] Filed: Aug. 18, 1976

[30] Foreign Application Priority Data

Aug. 19, 1975 [DE] Fed. Rep. of Germany ....... 2536841

[51] Int. Cl.$^2$ ............................................. B64D 17/16
[52] U.S. Cl. .................................... 244/152; 244/145
[58] Field of Search ...................... 244/145, 142, 152

[56] References Cited

U.S. PATENT DOCUMENTS

| | | | |
|---|---|---|---|
| 2,318,674 | 5/1943 | Coleman | 244/145 X |
| 2,683,575 | 7/1954 | Heinrich | 244/142 |
| 2,703,212 | 3/1955 | Heinrich | 244/152 |
| 2,737,358 | 3/1956 | Heinrich | 244/145 |
| 3,240,451 | 3/1966 | Sepp | 244/145 |
| 3,690,603 | 9/1972 | Lemoigne | 244/145 |

Primary Examiner—Barry L. Kelmachter
Attorney, Agent, or Firm—Robert E. Burns; Emmanuel J. Lobato; Bruce L. Adams

[57] ABSTRACT

A parachute comprises a canopy having front and rear sections and a base with shroud lines attached to the base at circumferentially spaced-apart locations therearound. A plurality of brake flaps are disposed below the canopy base and between the shroud lines at the canopy rear section and are selectively adjustable between an inactive position wherein the brake flaps are fully slackened and interfere minimally with the inherent flight characteristic of the parachute and an active position wherein the brake flaps are fully extended and effectively brake the forward velocity of the parachute to thereby increase the parachute angle of descent. A set of control lines attached to the brake flaps selectively and adjustably effect actuation thereof between the active and inactive positions to accordingly control the parachute angle of descent.

10 Claims, 17 Drawing Figures

PARACHUTE WITH SELECTIVELY ADJUSTABLE BRAKE FLAPS FOR CONTROLLING ANGLE OF DESCENT

The invention relates to a parachute with flaps which consist of parachute material such as parachute silk, synthetic fabric or the like and which are disposed on the canopy of the parachute.

Controllable parachutes are known, the canopy of which is provided with control slots. Depending on their construction and arrangement, they can serve to steer the parachute to the right and left and also to influence the angle of descent of the parachute, especially in the case of a gliding parachute.

Insofar as the control systems heretofore known function to bring about and/or influence the angle of descent of gliding parachute, such has been achieved with parachute canopies with a relatively complicated construction, which thus involves a correspondingly expensive manufacturing process. In addition, the control systems can often only be used for a specific type of parachute. The operational reliability of the gliding parachutes which are thus controlled is not always assured because of their complex construction which is complicated by control members.

The problem therefore arises of improving the controllability of parachutes by means of flaps, in particular to influence the angle of descent, so that the flaps can be used substantially universally and parachutes which can thus be controlled can be produced at reasonable cost. In addition, a high degree of operational reliability is required for the parachute and the control system itself.

According to the present invention a parachute comprises a canopy, shroud lines attached to the base of the canopy, and brake flaps fitted below the base of the canopy between the shroud lines on the rear section of the parachute.

Gliding parachutes are already known wherein additional panels or webs are secured between the shroud lines, at the base and at both sides of the canopy, that is to say disposed opposite one another. However, they do not form brake flaps but simply stablilizing members which, in their arrangement in pairs opposite one another, are intended to stabilize the gliding flight path of the parachute. The arrangement and effect are similar to that of a ship's keel or a vertical control surface of an aircraft. Consequently they neither fulfil the purpose of influencing the angle of descent of the parachute, nor are they suitable for this purpose.

The brake flaps provided immediately below the base on the rear section of the canopy, according to the invention, cause a drag force in a gliding parachute (in relation to the gliding direction as a forward direction), the magnitude of which depends on the number, construction and size of the brake flaps.

The invention can also be applied to round-canopy parachutes. Round-canopy parachutes of normal construction glide or swing in an angular range of at least ± 20° in relation to the vertical, or they execute a combined movement. The reason for this lies in the static instability of this parachute in the region of the zero-degree position. The unwanted swinging motions are avoided by using the brake flaps according to the invention. At the same time, a gliding motion is imparted to the parachute, actually in the range of about 8° to 10°, but this is acceptable for many applications. Where it is desired to avoid an angle of descent, however, a small gliding characteristic can be imparted to the round canopy, which is then again compensated for by using the drag component. By this means, a swing-free flight is achieved with an angle of descent to the vertical of substantially 0°.

In any case, the brake flaps are preferably disposed in a row side by side in the rear section of the canopy so that they extend downwards from the base like an apron.

For many purposes, however, a division is preferable so that the brake flaps are disposed in groups side by side, symmetrically in relation to the central axis of the canopy. As a result of the symmetrical arrangement of groups at both sides of the central axis of the canopy four, six, or even eight, etc., groups of brake flaps can be combined side by side. This solution acquires particular significance for canopies equipped with control slots, as will be explained later in detail.

Particularly for load parachutes, it is possible to dispose the brake flaps in non-adjustable stationary positions. In the majority of cases, however, it is preferable, and in this there lies a very important feature of the invention, that the brake flaps should be arranged to be adjustable selectively between an active and an inactive position during the flight by the jumper or mechanically, for example by means of a harness. Intermediate positions are also possible. By this means the angle of descent of a parachute, particularly of a gliding parachute, can be varied in a relatively simple manner. If the angle of descent which can be achieved as a result of the construction of the canopy is to be fully utilized the brake flaps are brought into their inactive position. If a reduction in the angle of descent from the vertical is required, then the brake flaps are set in their active position or in some intermediate position. For this purpose, the brake flaps are so constructed and arranged that they reduce the propulsive force of the canopy so that even a vertical descent can be achieved. In any case, in their inactive position, the brake flaps assume a position in which the canopy substantially displays a flight characteristic which corresponds to that of corresponding canopies without brake flaps i.e., the brake flaps are fully slackened and trail behind the canopy and therefore interfere minimally with the inherent or normal flight characteristics of the parachute.

The arrangement of the brake flaps in groups, distributed symmetrically in relation to the center axis of the canopy and their adjustability out of the active into the inactive position and vice versa is of particular importance for parachutes with known control slots arranged symmetrically at two opposite sections of the canopy. The controllability of the parachute, depending primarily on the effect of the control slots, can be substantially improved as a result of the fact that the brake flaps situated at one side of the center axis of the canopy, and which are disposed continuously in a row or in groups, can be actuated jointly with the control slot at this side in such a manner that they assume their active position when the control slot in question is closed. Of course this also applies when there are a plurality of control slots at each side.

It is known that for a left-hand curve of the parachute, the control slot situated at the left-hand side of the canopy is actuated, that is to say closed, so that the canopy is given a counterclockwise movement as a result of the action of the control slot situated at the right-hand side. If, in addition, the brake flaps which are likewise situated at the left of the center axis of the canopy are wholly or partially set in their active position, it is possible for the parachute to fly a very tight left-hand curve. The effect of the control slot is effectively reinforced by the brake flaps situated on the left. The actuating members for the associated control slots and brake flaps or groups of brake flaps are therefore connected to one another for simpler operation. If, instead of a left-hand or right-hand control, the angle of descent of the parachute merely has to be altered, then the systems of control slots and brake flaps situated at the right and left are actuated jointly. In this case, too, their effects are added and combined together.

The effect of this combination is comparable to the combined effect of side rudder and aileron in an aircraft. As a result of actuation of the rudder, a rotation about its vertical axis is imparted to the aircraft, comparable to the actuation of a control slot. If the corresponding aileron is actuated in addition, a considerably tighter curve of the aircraft is rendered possible, comparable to the effect of the additional actuation of the corresponding group of brake flaps.

The brake flaps are preferably adjustable as a result of the fact that the upper edge of each brake flap is secured to the base, and control lines, which extend to the jumper or to a mechanical harness and which are taken to adjacent shroud lines, are provided at the lower edge and particularly at the corners of the brake flaps. The control lines can be connected to the shroud lines by means of rings for example. If a pull is exerted on the control lines by the jumper or mechanically, then the brake flaps unfold from the base until they have reached their full size below the canopy and are held in this position by the control lines. If the pull of the control lines is relaxed, then the brake flaps are pulled upwards towards the edge of the canopy either automatically by the force of the air or mechanically. They are allowed to float in the wake of the flow of air flowing round the canopy where they cannot exert any appreciable effect on the flight path of the parachute.

There are a number of different possibilities for the shape and construction of the brake flaps. Fundamentally, preference should be given to brake flaps which are made permeable either by the provision of apertures or by the use of air-permeable material or by a combination of air-permeable material and apertures. The permeability of the brake flap realized in one form or the other counteracts an unwanted bearing of the air stream against the brake flaps, so as to prevent too powerful a drag force which might cause the parachute to fly backwards. Only when it is desired to use the brake to reverse the direction of movement or gliding of the parachute from forward to backward flight, would brake flaps with relatively little permeability or even impermeable brake flaps be used.

The brake flaps are preferably constructed in hood form, in conjunction with the above-mentioned permeability conditions, and an aperture at the end of the hood (seen in the direction of the air flow through the hood) has proved particularly effective.

It has been found that a hood shape is particularly preferred wherein the brake flap has a cover which, in the active position, forms a substantially rectangular opening for the inflowing air with an extension following upwards in the form of a substantially semicircular widened port bounded by the adjacent edge of the base and with a substantially triangular rear wall opposite the opening and the widened portion at the other side of the control flap. The base of the rear wall coincides with the lower narrow side of the opening and extends upwards from there at an angle of 30°–80°, and preferably 60°, to the area of the rectangular opening, where a rounded triangular point is cut away as a port.

As a result of this shape, a very powerful braking effect and an effect on the angle of descent which is stabilizing to a high degree is imparted to the brake flaps. In addition, any swinging is avoided in a gliding parachute thus equipped. In the inactive position of the brake flaps, an optimum gliding flight is achieved and in the active position of the brake flaps, a vertical flight can be set. An unwanted backward flight is avoided as a result of the cooperation of the shape of the brake flap and the flow of air through the port and through the walls of the brake flap.

Instead of the above-mentioned hood shape, it is also possible that the brake flaps may be constructed in the form of networks of bands, strips or rings of parachute material. As a result, ports for the flow of air are formed distributed over the whole area of the brake flap, as a result of which the application of the air flow with the unwanted consequence of a very powerful drag component is avoided. Instead, here too, as when the hood shape is used, a flow pattern develops which is symmetrical to the center axis, and, in their active position, the brake flaps render possible a variation of the flight path of the parachute out of the flat gliding flight into a steeper or into a vertical flight. Thus they permit a control of the angle of descent within wide limits.

In special cases, it is also possible for the brake flaps each to be constructed in the form of a plane closed section of parachute material or a similar flexible material. Since, in this case, however, application of the air flow generally occurs, a backward flight of the parachute thus equipped can scarcely be avoided when the brake flaps are fully extended, so that this form of embodiment is recommended particularly when a reversal of the direction of gliding is required.

Examples of parachutes according to the invention will now be described with reference to the accompanying drawings, in which.

Figure 1:
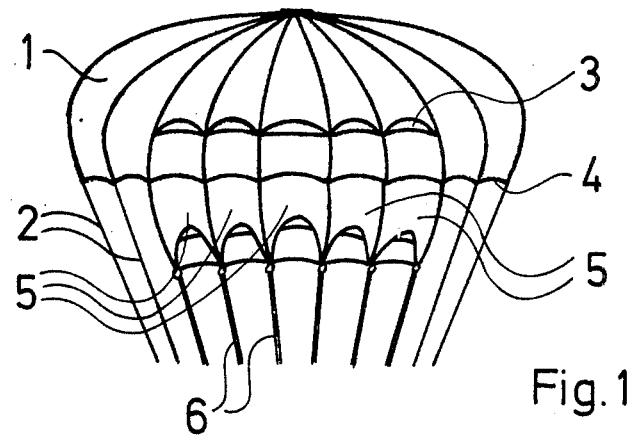
FIG. 1 shows a rear view of a canopy of a gliding parachute equipped with hood-shaped brake flaps.
Figure 2:
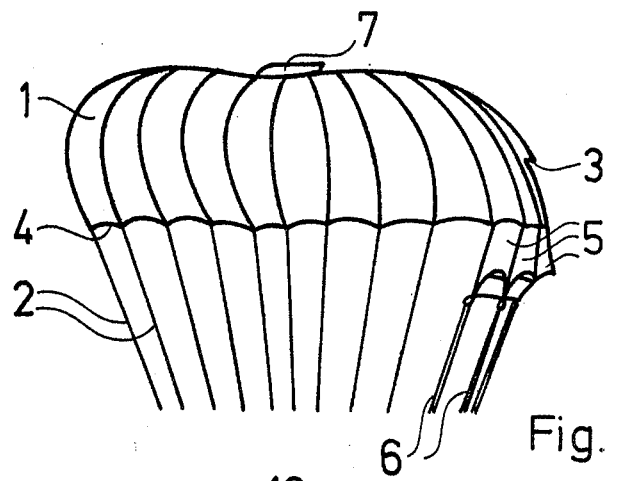
FIG. 2 shows a side view of the gliding parachute of FIG. 1.

The canopy 1 of a gliding parachute, illustrated in FIGS. 1 and 2, has an aerofoil wing-like profile in the side view of FIG. 2 with shroud lines 2 being attached at the edge or at the base 4 of the canopy 1 in the usual manner. The gliding characteristics of this type of parachute depend not only on the aerofoil wing characteristic and other features but also on a flow deflector 7 disposed centrally above the canopy 1 and transverse slots 3 in the rear section of the canopy.

At the rear section of the canopy, five hood-shaped brake flaps 5 are disposed immediatley below the base 4, in a symmetrical arrangement, as can be seen from the drawing, and each is positioned between a pair of shroud lines 2.

Figure 3:
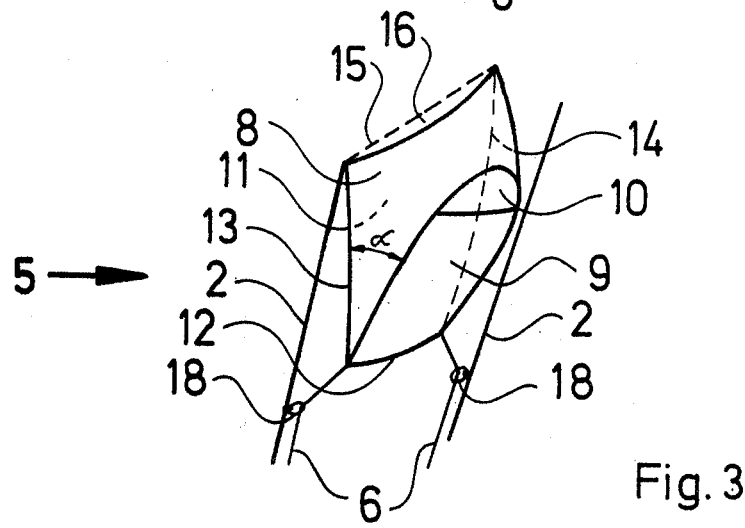
FIG. 3 is a diagrammatic illustration of a hood-shaped brake flap, such as is used with the gliding parachute of FIGS. 1 and 2, on a larger scale.

FIG. 3 shows that two control lines 6, which are provided spaced apart at the lower corners of the brake flap, are provided at the lower edge 12 of such a brake flap 5 and extend toward and run along the lengths of the adjacent shroud lines 2 by means of rings 18.

When a downward-acting pull is exerted on the control lines 6 by the jumper or in a mechanical manner, for example by means of a harness, the brake flaps 5 assume the active position illustrated in FIGS. 1 and 2 and particularly in FIG. 3. If the pull relaxes, then the brake flaps 5 are pushed upwards or folded up towards the edge or towards the base 4, either automatically by the force of air or mechanically, the control lines 6 sliding upwards, following the brake flap 5, through the rings 18. The brake flaps 5 then float somewhat in the wake of the air flow in the manner which can be seen from FIG. 4. In this position, the brake flaps 5 assume a so-called inactive position. In addition, intermediate positions are possible.

FIG. 3 shows that the hood-shaped brake flaps 5, which are made of parachute material, have a cover 8 which, when curved forms, internally, a substantially rectangular opening 11, which is partially indicated by broken lines and which is bounded by a lower and an upper narrow side 12 and 15 respectively and longitudinal sides 13, 14. At the top, a substantially semicircular widened portion 16 follows on the opening 11. At the back of the brake flap 5 there is substantially triangular rear wall 9, the base of which coincides with the lower narrow side 12 of the opening 11, while a port 10 is left free at the rounded upper triangular point. Depending on the form of embodiment, the rear wall 9 extends at an angle of about 60° to the longitudinal sides 13, 14 of the front opening 11. Further details follow in connection with FIGS. 15 – 17. The brake flap 5 assumes the shape described in the active position, and the air entering the opening 11 and the widened portion 16 can emerge again through the port 10.

Figure 4:
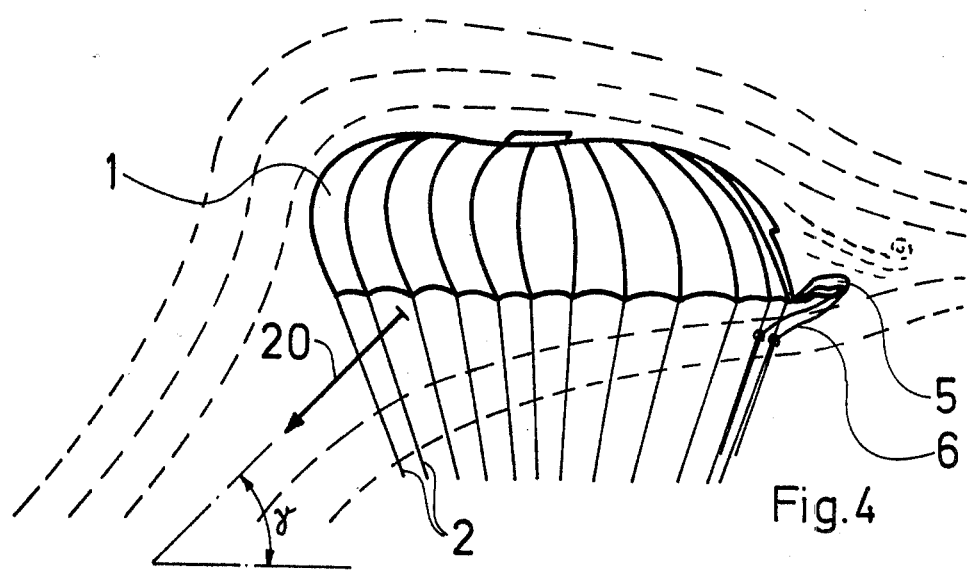
FIG. 4 shows a side view of a gliding parachute as shown in FIGS. 1 – 3 with the air-flow pattern in the inactive position of the brake flaps.
Figure 5:
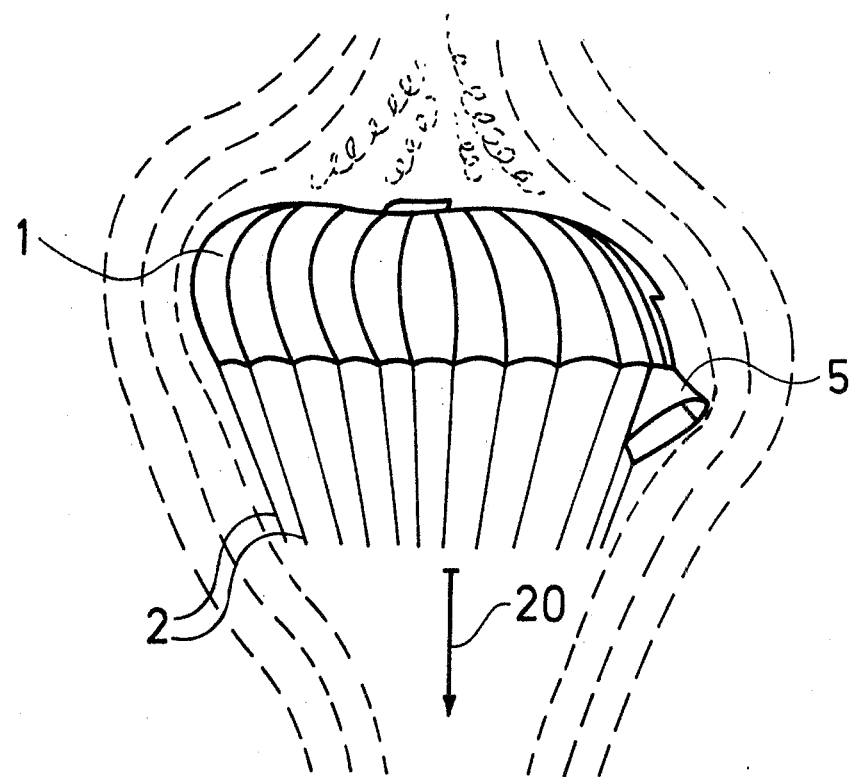
FIG. 5 shows an illustration as in FIG. 4, but with the active position of the brake flaps.
Figure 6:
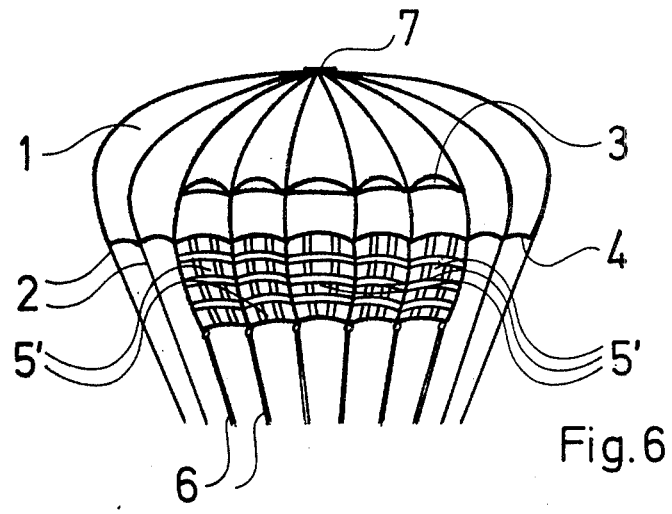
FIG. 6 shows a rear view of a gliding parachute with net-like brake flaps.
Figure 7:
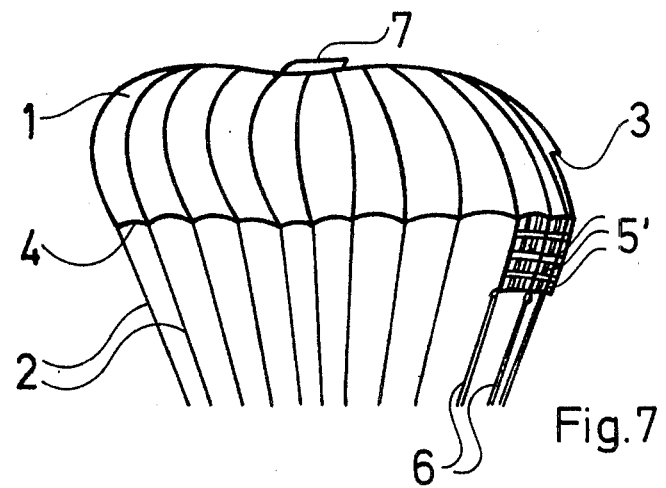
FIG. 7 shows a side view of the gliding parachute of FIG. 6.
Figure 8:
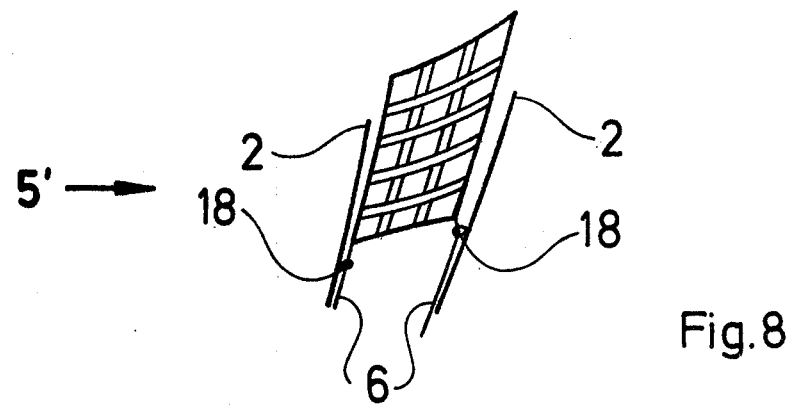
FIG. 8 is a diagrammatic illustration of a net-like brake flap used in FIGS. 6 and 7, on a larger scale.

In the illustration shown in FIG. 4, the brake flaps 5 are in the inactive position so that the flight path of the parachute is determined by the angle of descent (measured in relation to the horizontal), as illustrated by the arrow 20, which would also be the determining factor if no brake flaps 5 were disposed in the rear section of the canopy. In contrast to this, in the illustration shown in FIG. 5, the brake flaps 5 are in their fully unfolded position, that is to say in the active position, in which they alter the angle of descent. In the present form of embodiment, the shape, size and number of the brake flaps 5 is such that, in the active position, the brake flaps 5 bring the angle of descent to 90° and so render a vertical flight of the parachute possible. As already stated, intermediate positions are possible for the brake flaps 5, in which only a greater or lesser alteration of the angle of descent is caused, without vertical flight occurring.

In the second example of an embodiment as shown in FIGS. 6 – 9, planar brake flaps 5' in the form of nets are used, which consist of bands, strips or rings of parachute material or a similar flexible material, that is to say substantially of the same material as the hood like brake flaps 5 described previously. As a result, each brake flap 5' is permeable across its area in relation to the air flowing towards the brake flaps 5'. This permeability prevents the air flow causing an undesirably strong drag force which can lead to the backward flight of the parachute.

Figure 9:
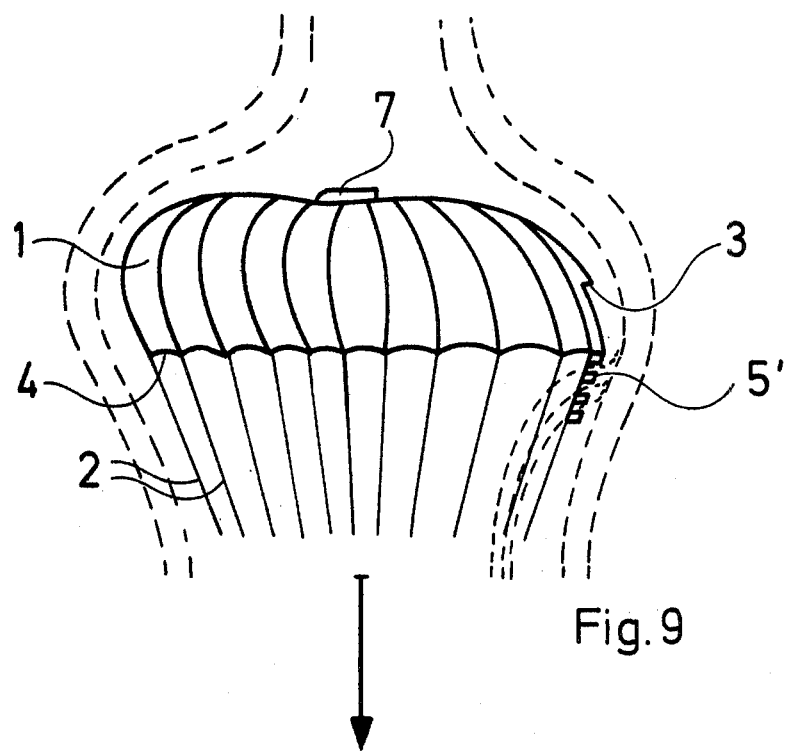
FIG. 9 is a side view of the gliding parachute of FIGS. 6 – 8 with the air-flow pattern in the active position of the net-like brake flaps.

Apart from this, the planar and net-like brake flaps 5' are fitted and controllable in the same manner as the brake flaps 5 so that a more detailed description of the drawings can be dispensed with. FIG. 9 illustrates the bringing about of a vertical flight of the gliding parachute and such is achieved by actuating the net-like brake flaps 5' to the active position.

Figure 10:
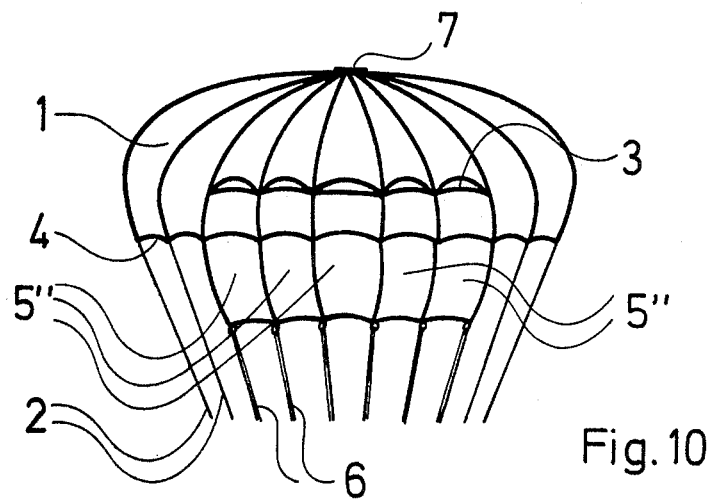
FIG. 10 shows a rear view of a gliding parachute with brake flaps of plane and closed construction.
Figure 11:
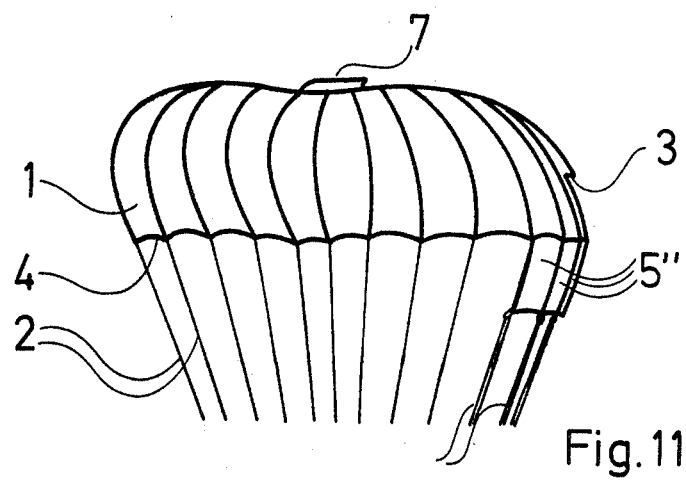
FIG. 11 shows a side view of the gliding parachute of FIG. 10.
Figure 12:
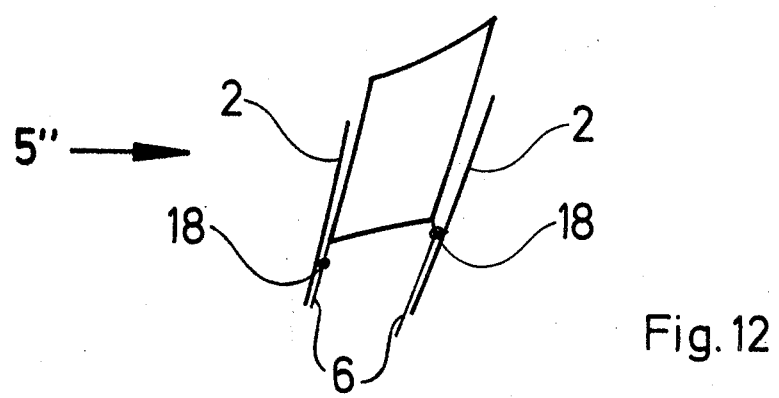
FIG. 12 is a diagrammatic illustration of a brake flap of plane and closed construction, such as is used in the gliding parachute of FIGS. 10 and 11.

The further example, illustrated in FIGS. 10 – 12, corresponds in construction and arrangement of the brake flaps to the example described above, but instead of the brake flaps 5' of net-like construction, brake flaps 5" of planar and closed construction formed of parachute material with the usual air permeability are provided. With these brake flaps 5", which are fitted and controllable in the same manner as in the previous examples, there is an application of the air flow in the active position and a resulting powerful drag force. Therefore, this form of embodiment is preferred above all where a reversal of the direction of gliding from forward flight to backward flight is desired.

Figure 13:
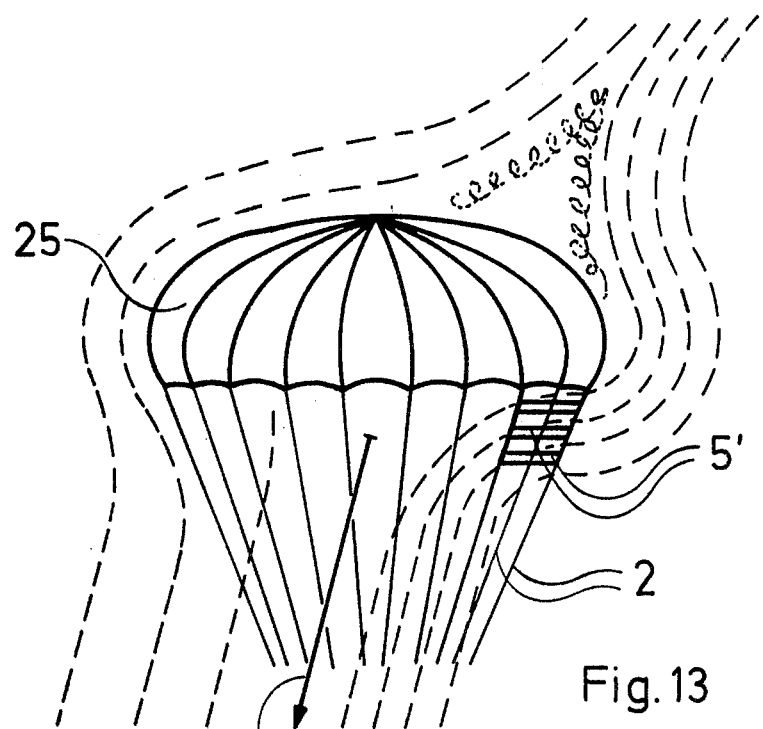
FIG. 13 shows a side view of a round-canopy parachute equipped with net-like brake flaps, with flow pattern.

FIG. 13 shows that the brake-flap system according to the invention can also be used on round-canopy parachutes. The normal gliding characteristic of the round canopy 25 is partially compensated in the above position of the planar, net-like brake flaps 5' used therein. As a result of the use of the brake-flap system, above all, the uncontrollable and unwanted swinging of the round-canopy parachute is avoided, while a slight angle of descent which remains despite the brake flaps 5' and which is illustrated by the arrow 26, can easily be accepted.

Figure 14:
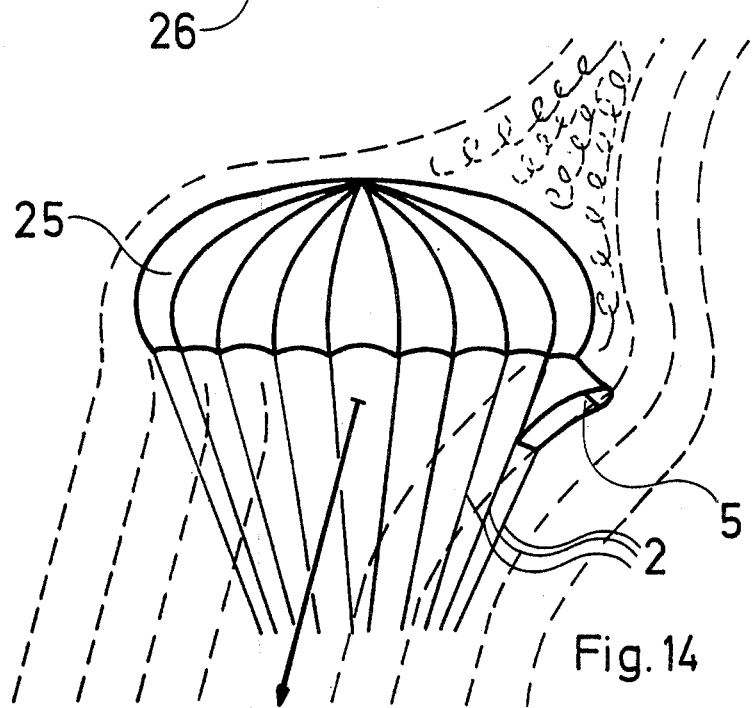
FIG. 14 shows a side view of a round-canopy parachute equipped with hood-shaped brake flaps, with air-flow pattern; and, FIGS. 15 – 17 are scale-sized illustrations of a preferred embodiment of the hood-shaped brake flaps.

The same applies to the round-canopy parachute as shown in FIG. 14 where, instead of net-like brake flaps 5', hood-shaped brake flaps 5 are used, as already described in detail with regard to construction, shape and effect, in connection with FIGS. 1 – 5.

Figure 15:
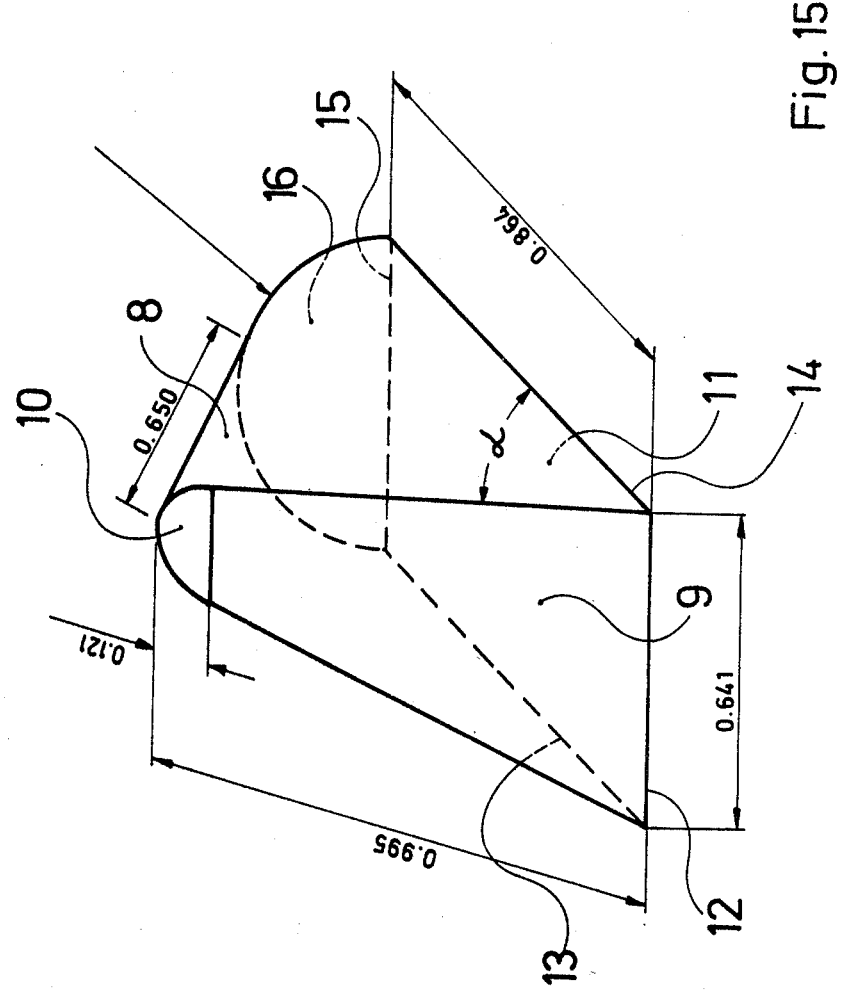
Figure 16:
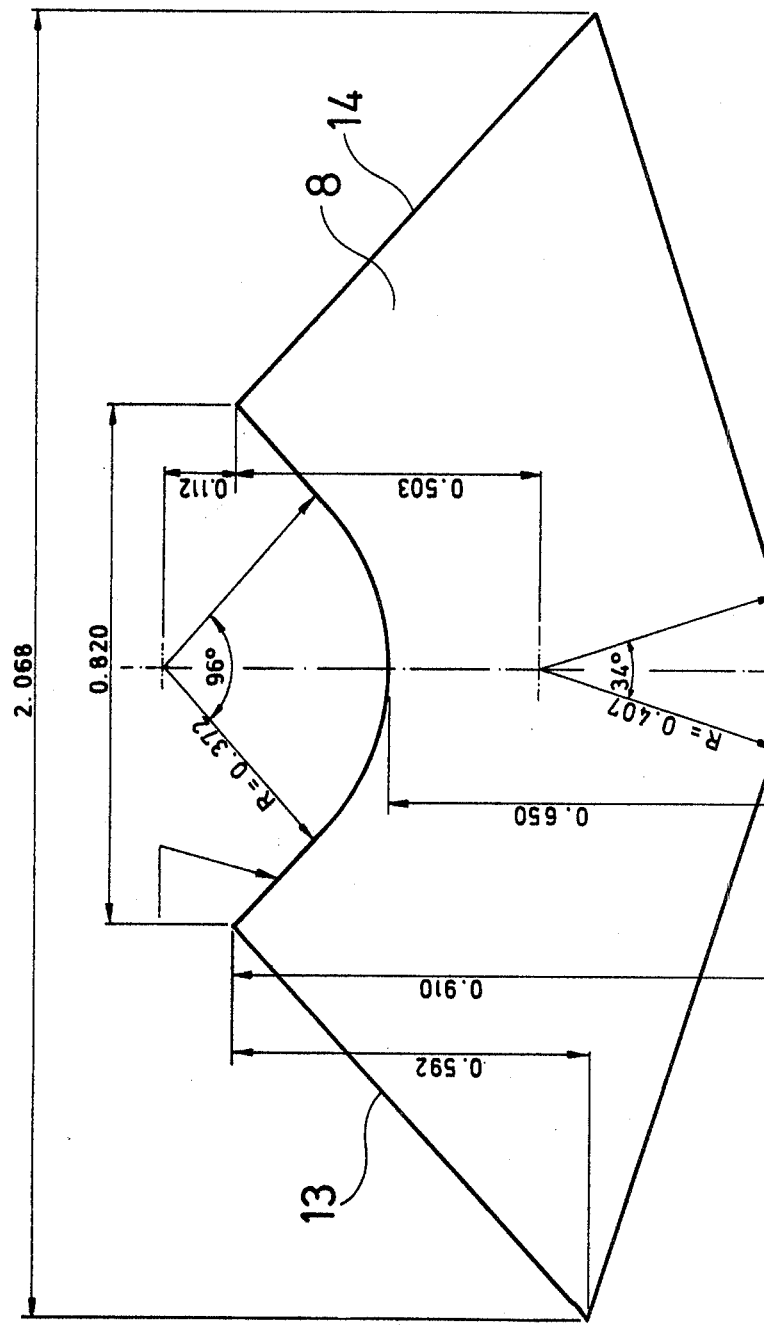
Figure 17:
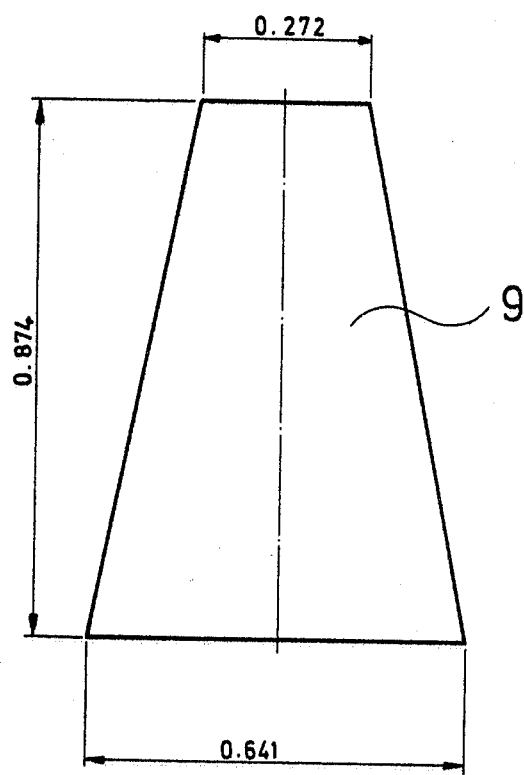

FIGS. 15 – 17 show in detail the shape and relative dimensions of the hood-like brake flap 5 illustrated in FIG. 3, all dimensions being expressed as fractions of a unit length of that arc which bounds the semicircular widened portion 16 of the opening 11. FIG. 15 shows the shape of a hood-like brake flap 5 already described, while the development of the sheath 8 is represented in FIG. 16 and a plan view of the rear wall 9 in FIG. 17. It is understood, of course, that the scale illustration and description are not intended to represent any restriction of the invention, but merely a concrete example of a type which has proved satisfactory in test trials.

I claim:

1. A parachute comprising: a canopy having front and rear sections and a base; shroud lines attached to said base at circumferentially spaced-apart locations therearound; and braking means for selectively controlling the angle of descent of the parachute by braking the forward velocity thereof comprising a plurality of brake flaps disposed below the canopy base and between said shroud lines at the canopy rear section and selectively adjustable between the inactive position wherein said brake flaps are fully slackened and interfere minimally with the inherent flight characteristics of the parachute and an active position wherein said brake flaps are fully extended and effectively brake the forward velocity of the parachute to thereby increase the parachute angle of descent, and a set of control lines attached to said brake flaps to selectively and adjustably effect actuation thereof between said active and inactive positions to accordingly control the parachute angle of descent.

2. A parachute according to claim 1, wherein said brake flaps are disposed in side-by-side relationship in a row which extends circumferentially along the canopy rear section.

3. A parachute according to claim 1, wherein said control lines extend, in use, along a path closely adjacent said shroud lines so as to be within reach of a parachutist using the parachute.

4. A parachute according to claim 1, wherein said brake flaps are air permeable.

5. A parachute according to claim 4, wherein said brake flaps define ports to enable air to pass therethrough.

6. A parachute according to claim 1, wherein said brake flaps are hood-shaped.

7. A parachute according to claim 6, wherein each of said hood-shaped brake flaps defines a substantially rectangular opening when in said active position, and, in conjunction with said canopy base defines a substantially semicircular widened port in communication with said rectangular opening, each brake flap having a substantially triangular rear wall opposite said opening, said rear wall having a base coinciding with the lower narrow side of said rectangular opening, and said rear wall extending upwardly from its base at an angle of between substantially 30° and 80° to the plane of said rectangular opening.

8. A parachute according to claim 4, wherein said brake flaps are comprised of netlike material.

9. A parachute according to claim 4, wherein each of said brake flaps comprises a planar, closed section of suitable material.

10. A parachute according to claim 1; wherein said brake flaps are configured so as to effect a substantially vertical descent when in the fully extended active position.

* * * * *